(12) United States Patent
Jeon et al.

(10) Patent No.: US 10,691,935 B2
(45) Date of Patent: Jun. 23, 2020

(54) APPARATUS FOR PROVIDING GRAPHIC EFFECT OF HANDWRITING INPUT AND METHOD THEREOF

(71) Applicant: Samsung Electronics Co., Ltd., Gyeonggi-do (KR)

(72) Inventors: Hankyung Jeon, Gyeonggi-do (KR); Minsun Kim, Seoul (KR); Pilwon Kim, Seoul (KR); Jungwoo Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 15/947,344

(22) Filed: Apr. 6, 2018

(65) Prior Publication Data

US 2018/0293436 A1    Oct. 11, 2018

(30) Foreign Application Priority Data

Apr. 6, 2017  (KR) .................. 10-2017-0044759

(51) Int. Cl.
 *G06K 9/00* (2006.01)
 *G06F 3/01* (2006.01)
 *G06F 3/0488* (2013.01)
 *G06K 9/68* (2006.01)

(52) U.S. Cl.
 CPC ......... *G06K 9/00416* (2013.01); *G06F 3/018* (2013.01); *G06F 3/04883* (2013.01); *G06K 9/00429* (2013.01); *G06K 9/6821* (2013.01)

(58) Field of Classification Search
 None
 See application file for complete search history.

(56) References Cited

U.S. PATENT DOCUMENTS

| | | | | |
|---|---|---|---|---|
| 7,206,737 | B2* | 4/2007 | Seto | G06F 3/03545 178/19.02 |
| 7,409,090 | B2* | 8/2008 | Akiyama | G06K 9/222 382/181 |
| 8,111,927 | B2* | 2/2012 | Vincent | G06K 9/03 382/225 |
| 9,275,051 | B2* | 3/2016 | King | G06Q 30/02 |
| 10,163,004 | B2* | 12/2018 | Guarnieri | G06K 9/00416 |

(Continued)

FOREIGN PATENT DOCUMENTS

| | | | |
|---|---|---|---|
| CN | 102156889 | * | 3/2011 |
| CN | 102981693 B | * | 1/2015 |

(Continued)

OTHER PUBLICATIONS

Hsueh, Interactive Text Recognition and Translation on a Mobile Device, http://www.eecs.berkeley.edu/Pubs/TechRpts/2011/EECS-2011-57.html (Year: 2011).*

*Primary Examiner* — Andrae S Allison
(74) *Attorney, Agent, or Firm* — The Farrell Law Firm, P.C.

(57) ABSTRACT

A method for applying a graphic effect in an electronic device. The method includes identifying a stroke constituting a character based on an input sensed through a display of the electronic device, displaying the identified stroke through the display, identifying a language corresponding to the identified stroke, and identifying a variation value for a graphic effect of the displayed stroke based on a complexity of the identified language.

17 Claims, 19 Drawing Sheets

(56) References Cited

U.S. PATENT DOCUMENTS

| | | | | |
|---|---|---|---|---|
| 2002/0006220 A1* | 1/2002 | Kohchi | ............... | G06K 9/00456 382/165 |
| 2004/0202349 A1* | 10/2004 | Erol | ................... | G06K 9/00442 382/100 |
| 2005/0069173 A1* | 3/2005 | Morisada | ........... | G06K 9/00664 382/103 |
| 2008/0063277 A1* | 3/2008 | Vincent | .............. | G06K 9/00463 382/182 |
| 2008/0063278 A1* | 3/2008 | Vincent | .............. | G06K 9/00463 382/182 |
| 2008/0063279 A1* | 3/2008 | Vincent | .............. | G06K 9/00463 382/182 |
| 2009/0304283 A1* | 12/2009 | Predovic | ........... | G06K 9/00436 382/189 |
| 2017/0235373 A1* | 8/2017 | Mok | ................. | G06K 9/00416 382/189 |

FOREIGN PATENT DOCUMENTS

KR 10-2010-0063545 6/2010
KR 10-2013-0102702 9/2013

* cited by examiner

APPARATUS FOR PROVIDING GRAPHIC EFFECT OF HANDWRITING INPUT AND METHOD THEREOF

CROSS-REFERENCE TO RELATED APPLICATION(S)

This application is based on and claims priority under 35 U.S.C. § 119(a) to Korean Patent Application Serial No. 10-2017-0044759, which was filed on Apr. 6, 2017 in the Korean Intellectual Property Office, the entire disclosure of which is incorporated herein by reference.

BACKGROUND

1. Field

The disclosure relates, generally, to an apparatus and method for adaptively adjusting a graphic effect, and more particularly, to a graphic effect of a handwriting input sensed through a display in an electronic device.

2. Description of the Related Art

Conventional electronic devices can recognize handwriting inputs based on a touch, gesture, proximity or hovering input that uses a part of a user's body (e.g., finger), or an electronic pen. The electronic devices can display characters corresponding to the handwriting inputs through a display of the electronic device. The characters displayed through the display can include numbers and special symbols in addition to letters expressing linguistic meanings such as Hangeul or English.

When an electronic device includes a small display, such as a wearable device, a user of the electronic device may not able to write on the display of the wearable device, in view of the restricted or limited space on the display, and while the electronic device can provide a graphic effect in which a stroke can be displayed on the display, the graphic effect sometimes disappears when a given time has elapsed.

The user of the electronic device can input one or more strokes to write one character, but the number of strokes required for writing one character can be different for a given language for a given country. When a language (e.g., Hangeul, Chinese or Japanese) that typically requires many strokes to input one character, a previously inputted stroke can sometimes disappear while the user of the electronic device is inputting a new stroke for the same character, which, in turn, may cause the electronic device to fail to identify a completed character input.

SUMMARY

The disclosure has been made to address at least the disadvantages described above and to provide at least the advantages described below. Accordingly, the disclosure provides an apparatus and method for controlling a variation value for a graphic effect of a handwriting input based on a language of a recognized character.

In accordance with an aspect of the disclosure, there is provided a method for applying a graphic effect in an electronic device. The method includes identifying a stroke constituting a character based on an input sensed through a display of the electronic device, displaying the identified stroke through the display, identifying a language corresponding to the identified stroke, and identifying a variation value for a graphic effect of the displayed stroke based on a complexity of the identified language. In accordance with an aspect of the disclosure, there is provided an electronic device for applying a graphic effect. The electronic device includes a display, a memory, and a processor operatively coupled with the display and the memory and configured to identify a stroke constituting a character, based on an input sensed through the display, display the identified stroke, identify a language corresponding to the identified stroke, and identify a variation value for a graphic effect of the displayed stroke based on a complexity of the identified language.

In accordance with an aspect of the disclosure, there is provided an electronic device for applying a graphic effect. The electronic device includes a display, a memory, and a processor operatively coupled with the display and the memory and configured to identify a stroke constituting a character based on an input sensed through the display, display the identified stroke, identify a position where the displayed stroke is arranged on the display, and identify a variation value for a graphic effect of the displayed stroke based on the arranged position.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
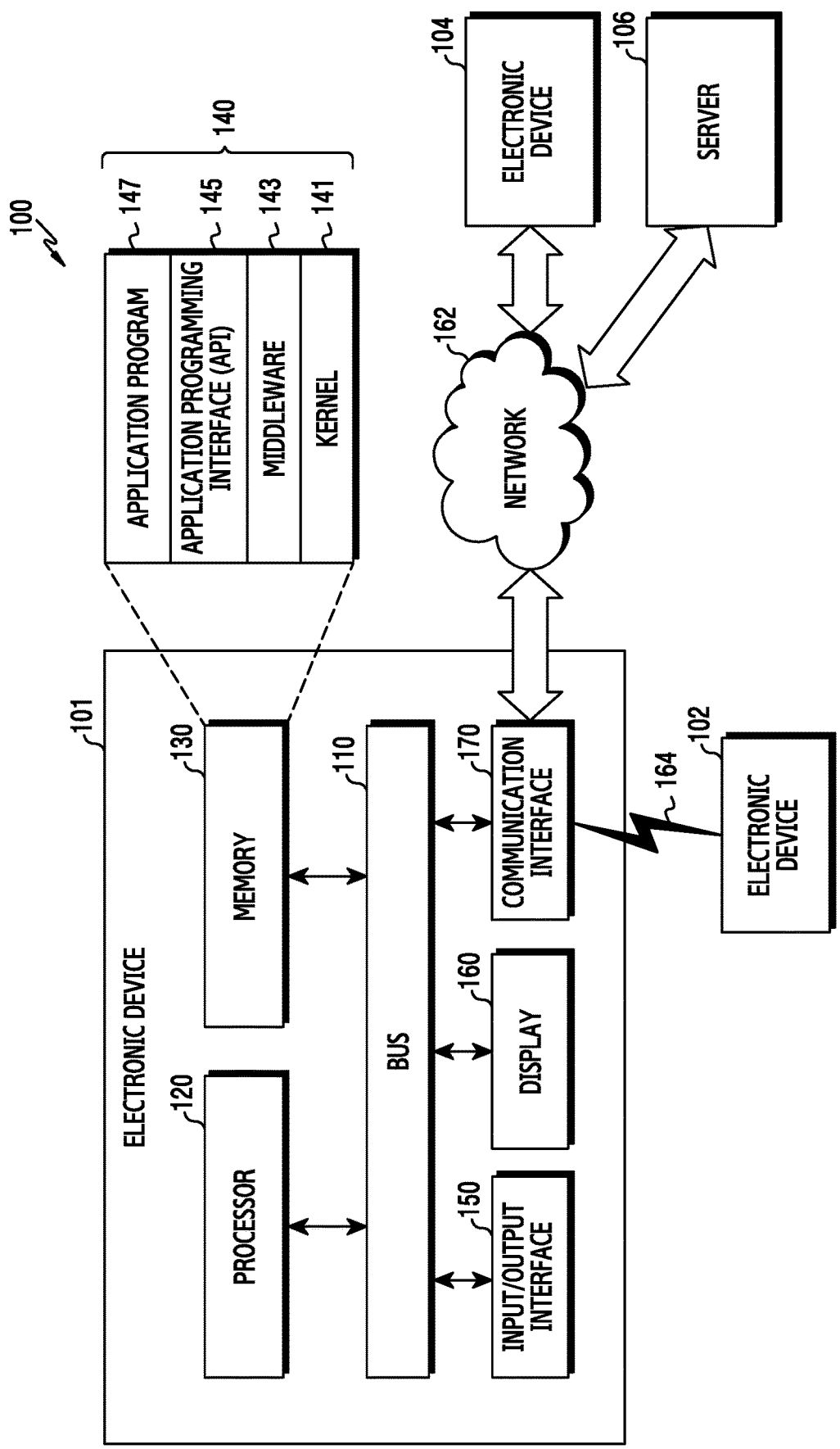
FIG. 1 is a diagram of a network environment including an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish one component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used herein in describing the various embodiments are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

In this disclosure a character is defined as a symbol which may have a linguistic definition, association, or implication. For example, with respect to a number, each number '0' to '9' corresponds to one character. In the English language, capital letters 'A' to 'Z', and small letters 'a' to 'z' each correspond to one character. In Hangeul (Korean language), a combination of an initial consonant, a medial vowel, and a final consonant constitutes one character, and in a special symbol, each special symbol such as T, and '#' corresponds to one character.

In this disclosure, one stroke may include a time point at which a touch input is sensed in an electronic device to a time point at which the corresponding touch input is released. One character may consist of at least one stroke. The complexity of language is defined according to how many strokes constitute one character. A value indicating the complexity is proportional to the number of strokes constituting each character. For example, the letter 'a' may be written by one stroke, so the electronic device may recognize the complexity of 'a' as the lowest value (e.g., 1). On the other hand, with respect to a Hangeul '갂' which may be written by four strokes, the electronic device may recognize the complexity of '갂' as a higher value (e.g., 2, 3, or 4) than the complexity of 'a'.

In a Latin-series language such as English, the number of strokes for expressing one character is relatively less, whereas in an Asian-series language such as Hangeul, Japanese and Chinese, the number of strokes for expressing one character is relatively many. Therefore, an average complexity of the Latin-series language is less than an average complexity of the Asian-series language. An electronic device for adaptively adjusting, according to a complexity of a language, a graphic effect of a stroke displayed through a display of the electronic device is now described herein.

Referring initially to FIG. 1, an electronic device 101 resides in a network environment 100. The electronic device 101 includes a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a central processing unit (CPU), an application processor (AP), and a communication processor (CP). The processor 120 can perform an operation or data processing with respect to control and/or communication of at least another component of the electronic device 101.

The memory 130 can include a volatile and/or nonvolatile memory. The memory 130 can store commands or data relating to at least another component of the electronic device 101. The memory 130 can store software and/or a program 140. The program 140 can include a kernel 141, middleware 143, an application programming interface (API) 145, and/or an application program (application) 147. At least part of the kernel 141, the middleware 143, or the API 145 can be referred to as an operating system (OS). The kernel 141 can control or manage system resources (e.g., the bus 110, the processor 120, or the memory 130) used for performing operations or functions implemented by the other programs (e.g., the middleware 143, the API 145, or the application 147). Additionally, the kernel 141 can provide an interface for controlling or managing system resources by accessing an individual component of the electronic device 101 from the middleware 143, the API 145, or the application 147.

The middleware 143 can serve an intermediary role for exchanging data between the API 145 or the application 147 and the kernel 141 through communication. Additionally, the middleware 143 can process one or more job requests received from the application 147, based on their priority. The middleware 143 can assign a priority for using a system resource (e.g., the bus 110, the processor 120, or the memory 130) of the electronic device 101 to at least one of the application 147, and process the one or more job requests. The API 145, as an interface through which the application 147 controls a function provided from the kernel 141 or the middleware 143, can include at least one interface or function (e.g., an instruction) for file control, window control, image processing, or character control. The input/output interface 150 can deliver commands or data inputted from a user or another external device to other component(s) of the electronic device 101, or output commands or data inputted from the other component(s) of the electronic device 101 to the user or another external device.

The display 160 can include a liquid crystal display (LCD), a light emitting diode (LED) display, an organic LED (OLED) display, a microelectromechanical Systems (MEMS) display, or an electronic paper display. The display 160 can display various contents (e.g., texts, images, videos, icons, and/or symbols) to the user. The display 160 can include a touch screen and receive touch, gesture, proximity, or hovering inputs by using an electronic pen or a user's body part.

The communication interface 170 can set a communication between the electronic device 101 and a first external electronic device 102, a second external electronic device 104, or a server 106. The communication interface 170 can communicate with the second external electronic device 104 or the server 106 over a network 162 through wireless communication or wired communication.

The wireless communication can include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication can include at least one of wireless-fidelity (WiFi), bluetooth (BT), BT low energy (BLE), Zigbee, near field communication (NFC), magnetic secure transmission, radio frequency (RF), and body area network (BAN). The wireless communication can include global navigation satellite system (GNSS). The GNSS can include global positioning system (GPS), GLONASS, Beidou navigation satellite system (Beidou), or Galileo (the European global satellite-based navigation system). Hereinafter, the GPS can be interchangeably used with the GNSS. The wired communication can include at least one of universal serial bus (USB), high definition multimedia interface (HDMI), recommended standard 232 (RS-232), power line communications, and plain old telephone service (POTS). The network 162 can include a telecommunications network, for example, at least one of computer network (e.g., local area network (LAN) or wide area network (WAN)), Internet, and telephone network.

Each of the first and second external electronic devices 102 and 104 can be of the same as or of a different type from that of the electronic device 101. All or part of operations executed in the electronic device 101 can be executed by the electronic device 102 or 104, or the server 106. To perform a function or service automatically or by request, instead of performing the function or the service by the electronic device 101, the electronic device 101 can request at least part of a function relating thereto from the electronic device 102 or 104, or the server 106. The electronic device 102 or 104, or the server 106 can perform the requested function or an additional function and send its result to the electronic device 101. The electronic device 101 can provide the requested function or service by processing the received result, using cloud computing, distributed computing, or client-server computing techniques.

The processor 120 can be functionally coupled to display 160 and memory 130 to perform overall operations for applying a graphic effect, and the processor 120 can be further coupled to at least one component of other components included in the electronic device 101 in addition to the display 160 and memory 130, to perform overall operations for applying a graphic effect.

The processor 120 may identify a stroke constituting a character based on an input sensed through display 160 and display the identified stroke through the display 160.

The processor 120 may identify a language corresponding to the identified stroke, and apply graphic effects based on a complexity of the identified language. In order to apply graphic effects based on the complexity of the identified language, processor 120 may adjust a variation value for the graphic effect. The variation value may include a delay or duration. The delay can be a value that indicates a time interval ranging from a time point at which a stroke is displayed through the display 160 to a time point at which a graphic effect of the displayed stroke is applied. The duration can also be a value that indicates a time interval ranging from a time point at which a graphic effect of a stroke is applied to a time point at which the application of the graphic effect of the stroke is completed.

If a disappearing effect of the displayed stroke is applied, the electronic device 101 may control the display 160 so that the displayed stroke in the display 160 disappears after a determined delay value elapsed, and may control the display 160 so that the stroke disappears completely after the determined duration value elapsed. The processor 120 may apply an effect in which a color of a displayed stroke is changed, an effect in which the displayed stroke is shifted to the left, an effect in which a displayed handwriting input disappears while being changed into a preset font, or an effect in which the displayed stroke disappears while being shifted to the left, or apply a combination of them.

The processor 120 identifies whether a language corresponding to the identified stroke is identified in order (or sequentially) to identify the language corresponding to the identified stroke. Namely, the processor 120 identifies whether the inputted stroke constitutes one character having a specific meaning. In response to character corresponding to the stroke being identified, the processor 120 can identify language corresponding to the identified character. For example, the processor 120 can identify language corresponding to the identified character based on a reference character stored in the memory 130. The reference character can be stored in the memory 130 in form of database. The processor 120 can identify a language corresponding to the identified character based on a combination between a currently inputted stroke and a previously inputted stroke. If the language corresponding to the identified character cannot be identified, the processor 120 can apply a graphic effect which has been set previously, without identifying another language.

The processor 120 identifies whether the identified language is the same as a previously identified language. In response to the set language not having been changed, the processor 120 does not identify a separate complexity, and applies the graphic effect set previously. In response to the identified language being different from the language set previously (e.g., the set language having been changed), the processor 120 identifies complexity corresponding to the changed (e.g., new) language, and updates variable value according to the complexity. The processor 120 applies the graphic effect according to the updated variable value.

The processor 120 identifies whether a complexity for a previous language has been increased. In response to the complexity not having been increased, the processor 120 applies a graphic effect according to a set variation value. In response to the complexity having been increased, the processor 120 updates a variable value according to the increased complexity.

The processor 120 applies a graphic effect of a stroke, based on a position where the stroke is arranged. The processor 120 may identify an area rate in which a displayed stroke occupies on the display 160 based on whether the number of regions where the displayed stroke is located among a plurality of regions included in the display 160 is greater than or equal to a given region threshold value. The processor 120 may identify a position where a stroke is arranged based on whether a distance between the displayed stroke and a center point given on the display 160 is greater than or equal to a given distance threshold value.

The processor 120 applies a graphic effect of a stroke based on a time for which the stroke is inputted. When the time for which the stroke is inputted is relatively long, which may be indicative of a length or the inputted stroke being long or a speed at which the stroke is inputted being slow, the processor 120 may set high a delay or duration for the graphic effect. Conversely, when the time for which the stroke is inputted is relatively short, which may be indicative of the length of the inputted stroke being short or the speed at which the stroke is inputted being fast, the processor 120 may set low the delay or duration for the graphic effect.

Figure 2:
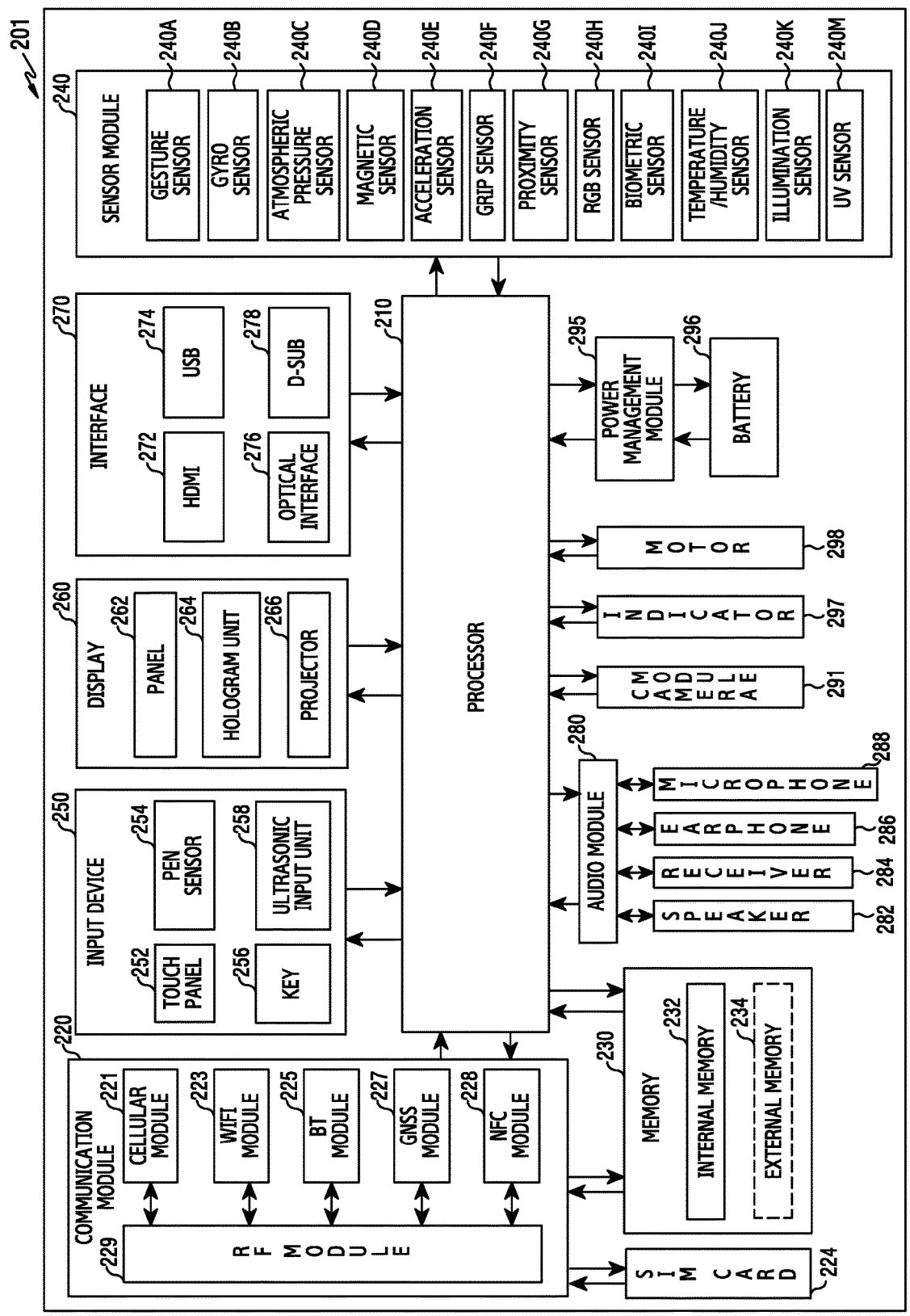
FIG. 2 is a diagram of an electronic device, according to an embodiment.

FIG. 2 is a diagram of an electronic device 201, according to an embodiment. The electronic device 201 can include all or part of the above-described electronic device 101 of FIG. 1.

The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 can control a plurality of hardware or software components connected to the processor 210, and also can perform various data processing and operations by executing an OS or an application program. The processor 210 can be implemented with a system on chip (SoC), for example. The processor 210 can further include a graphic processing unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include the cellular module 221, a WiFi module 223, a BT module 225, a GNSS module 227, an NFC module 228, and an RF module 229. The cellular module 221 can provide voice call, video call, short message service (SMS), or Internet service through a communication network. The cellular module 221 can identify and authenticate the electronic device 201 in a communication network by using the SIM 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one integrated circuit (IC) or an IC package. The RF module 229 can transmit/receive a communication signal (e.g., an RF signal). The RF module 229 can include a transceiver, a power amp module (PAM), a frequency filter, a low noise amplifier (LNA), or an antenna. At least one of the cellular module 221, the WiFi module 223, the BT module 225, the GNSS module 227, and the NFC module 228 can transmit/receive an RF signal through an additional RF module.

The SIM 224 can include a card including a SIM or can be an embedded SIM, and also can contain unique identification information (e.g., an integrated circuit card identifier (ICCID)) or subscriber information (e.g., an international mobile subscriber identity (IMSI)).

The memory 230 can include at least one of an internal memory 232 and an external memory 234. The internal memory 232 can include at least one of a volatile memory (e.g., dynamic random access memory (DRAM), static RAM (SRAM), or synchronous DRAM (SDRAM)), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 can include flash drive compact flash (CF), secure digital (SD), micro SD, mini SD, extreme digital (xD), multi-media card (MMC), or memory stick. The external memory 234 can be functionally or physically connected to the electronic device 201 through various interfaces.

The sensor module 240 can measure physical quantities or detect an operating state of the electronic device 201, and thus convert the measured or detected information into electrical signals. The sensor module 240 can include a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a bio sensor 240I, a temperature/humidity sensor 240J, an illumination sensor 240K, and an ultra violet (UV) sensor 240M. Additionally or alternatively, the sensor module 240 can include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 can further include a control circuit for controlling at least one sensor therein. The electronic device 201, as part of the processor 210 or individually, can further include a processor configured to control the sensor module 240 and thus control the sensor module 240 while the processor 210 is sleeping.

The input device 250 can include a touch panel 252, a (digital) pen sensor 254, a key 256, and an ultrasonic input device 258. The touch panel 252 can use at least one of capacitive, resistive, infrared, and ultrasonic methods. Additionally, the touch panel 252 can further include a control circuit and a tactile layer to provide a tactile response to a user. The (digital) pen sensor 254 can include part of a touch panel or a sheet for recognition. The key 256 can include a physical button, a touch key, an optical key, or a keypad. The ultrasonic input device 258 can detect ultrasonic waves from an input means through a microphone 288 and check data corresponding to the detected ultrasonic waves.

The display 260 can include a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include a high definition multimedia interface (HDMI) 272, a USB 274, an optical interface 276, or a d-subminiature (D-sub) 278. The interface 270 can be included in the communication interface 170 of FIG. 1. Additionally or alternatively, the interface 270 can include a mobile high-definition link (MHL) interface, a SD card/MMC interface, or an Infrared Data Association (IrDA) standard interface.

The audio module 280 can convert sounds into electrical signals and convert electrical signals into sounds. At least some components of the audio module 280 can be included in the input/output interface 150 of FIG. 1. The audio module 280 can process sound information inputted or outputted through a speaker 282, a receiver 284, an earphone 286, or the microphone 288.

The camera module 291, as a device for capturing still images and videos, can include one or more image sensors (e.g., a front sensor or a rear sensor), a lens, an image signal processor (ISP), or a flash (e.g., an LED or a xenon lamp).

The power management module 295 can manage the power of the electronic device 201. The power management module 295 can include a power management IC (PMIC), a charger IC, or a battery gauge. The PMIC can have a wired and/or wireless charging method. The wireless charging method can include a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as digital multimedia broadcasting (DMB), digital video broadcasting (DVB), or Media-Flo™.

Each of the above-described components of the electronic device 201 can be configured with at least one component and the name of a corresponding component can vary according to the kind of an electronic device. The electronic device 201 can be configured to include at least one of the above-described components or an additional component, or to not include some of the above-described components. Additionally, some of components in the electronic device 201 are configured as one entity, so that functions of previous corresponding components are performed identically.

Figure 3:
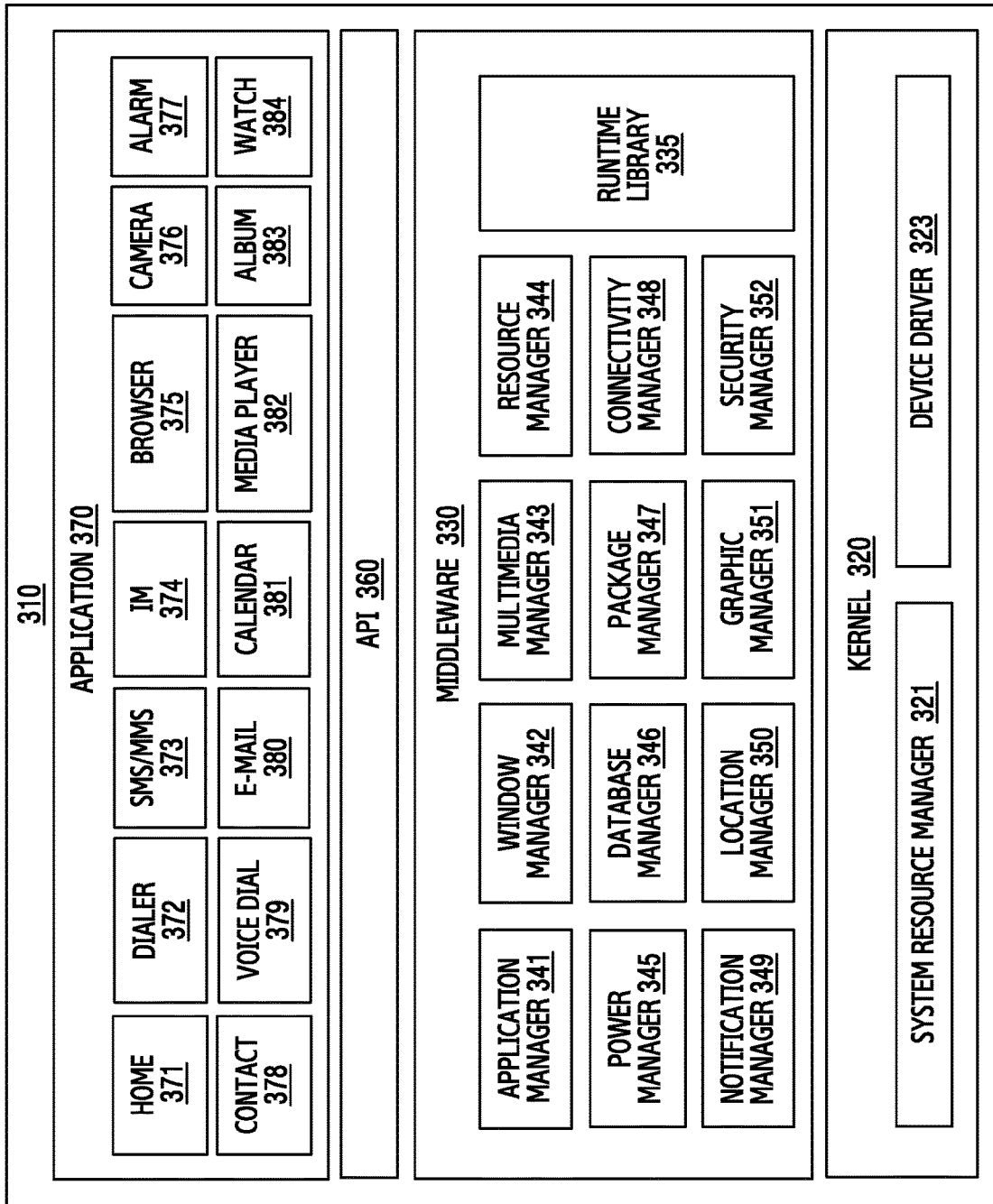
FIG. 3 is a diagram of a program module, according to an embodiment.

FIG. 3 is a diagram of a program module 310 according to an embodiment. The program module 310 (can include an OS for controlling a resource relating to an electronic device 101 and/or various applications (e.g., the application 147) running on the OS. The OS can include Android™, iOS™, Windows™, Symbian™, Tizen™, or Bada™. The program module 310 can include a kernel 320, a middleware 330, an API 360, and/or an application 370. At least part of the program module 310 can be preloaded on an electronic device or can be downloaded from an external electronic device 102, 104, or the server 106.

The kernel 320 includes at least one of a system resource manager 321 and/or a device driver 323. The system resource manager 321 can control, allocate, or retrieve a system resource. The system resource manager 321 can include a process management unit, a memory management unit, or a file system management unit. The device driver 323 can include a display driver, a camera driver, a BT driver, a sharing memory driver, a USB driver, a keypad driver, a WiFi driver, an audio driver, or an inter-process communication (IPC) driver. The middleware 330 can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include a library module used by a compiler to add a new function through a programming language while the application 370 is running. The runtime library 335 can manage input/output, manage memory, or arithmetic function processing. The application manager 341 can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 370 or a memory space. The power manager 345 can manage the capacity or power of the battery and provide power information for an operation of the electronic device. The power manager 345 can operate together with a basic input/output system (BIOS). The database manager 346 can create, search, or modify a database used in the application 370. The package manager 347 can manage installation or updating of an application distributed in a package file format.

The connectivity manger 348 can manage a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android™ or iOS™ can provide one API set for each platform, and Tizen™ can provide two or more API sets for each platform.

The application 370 can include at least one of a home application 371, a dialer application 372, an SMS/multimedia messaging system (MMS) application 373, an instant message (IM) application 374, a browser application 375, a camera application 376, an alarm application 377, a contact application 378, a voice dial application 379, an e-mail application 380, a calendar 3 application 81, a media player application 382, an album application 383, a clock application 384, a health care application (e.g., measure an exercise amount or blood glucose level), or environmental information (e.g., air pressure, humidity, or temperature information) provision application. The application 370 can include an information exchange application for supporting information exchange between the electronic device and an external electronic device. The information exchange application can include a notification relay application for relaying specific information to the external device or a device management application for managing the external electronic device. The notification relay application can relay notification information from another application of the electronic device to an external electronic device, or receive and forward notification information from an external electronic device to the user. The device management application can install, delete, or update a function (e.g.; turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

The processor 120 of the electronic device for applying a graphic effect is configured to identify a stroke constituting a character, based on an input sensed through the display 160, control the display 160 to display the identified stroke, identify a language corresponding to the identified stroke, and identify a variation value for a graphic effect of the displayed stroke, based on a complexity of the identified language.

The processor 120 may control the display 160 to apply an effect in which the displayed stroke and a previously displayed stroke disappear in order, or apply an effect in which the displayed stroke and the previously displayed stroke disappear simultaneously.

The processor 120 may control the display 160 to apply an effect in which the displayed stroke disappears while a color of the displayed stroke is changed, or apply an effect in which the displayed stroke disappears while the displayed stroke is shifted to the left.

The processor 120 is configured to, in response to a character corresponding to the identified stroke being identified, retrieve a language corresponding to the identified character, based on a reference character stored in the memory 130. The processor 120 is configured to, in response to the identified language having been changed, retrieve a complexity corresponding to the changed language, refine the variation value, based on the identified complexity, and apply a graphic effect of the displayed stroke, based on the refined variation value.

The processor 120 may, in response to the complexity of the identified language having been increased, refine the variation value, based on the increased complexity, and control the display 160 to apply the graphic effect of the displayed stroke according to the refined variation value.

The processor 120 may be configured to identify a stroke constituting a character, based on an input sensed through the display 160, control the display 160 to display the identified stroke, identify a position where the displayed stroke is arranged on the display 160, and identify a variation value for a graphic effect of the displayed stroke, based on the arranged position.

The processor 120 may identify a time for which the identified stroke is inputted, and refine the variation value, based on the identified time. The processor 120 may set the variation value to be higher in response to the identified time being longer than an input time of a previously identified stroke, and set the variation value to be lower in response to the identified time being shorter than the input time of the previously identified stroke.

An electronic device for adaptively adjusting, according to a complexity, a graphic effect of a stroke displayed through a display is now herein described with reference to FIG. 4 to FIG. 13, in which the operations may be performed, through instructions stored in the memory 130, by at least one of the electronic device 101, the processor 120 or the display 160 included in the electronic device 101.

Figure 4:
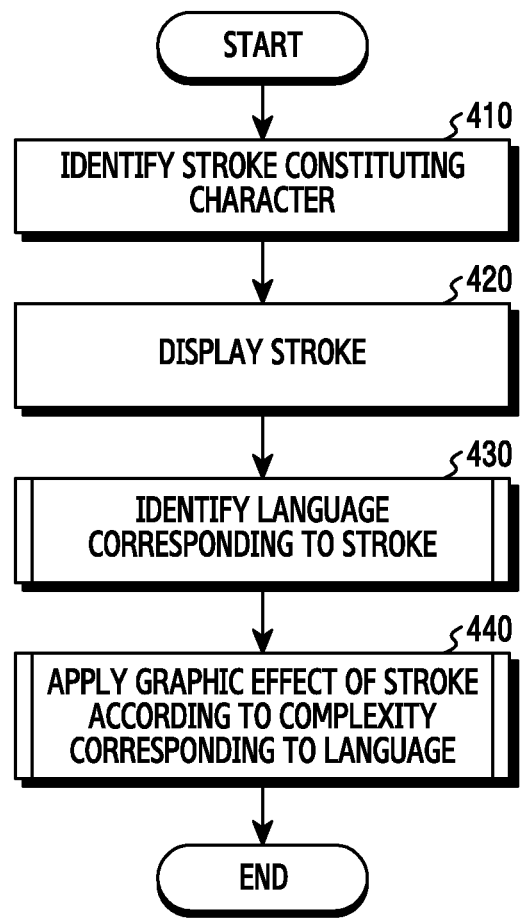
FIG. 4 is a flowchart of a method for applying a graphic effect of a stroke, based on a complexity corresponding to a language, in an electronic device, according to an embodiment.
Figure 5A:
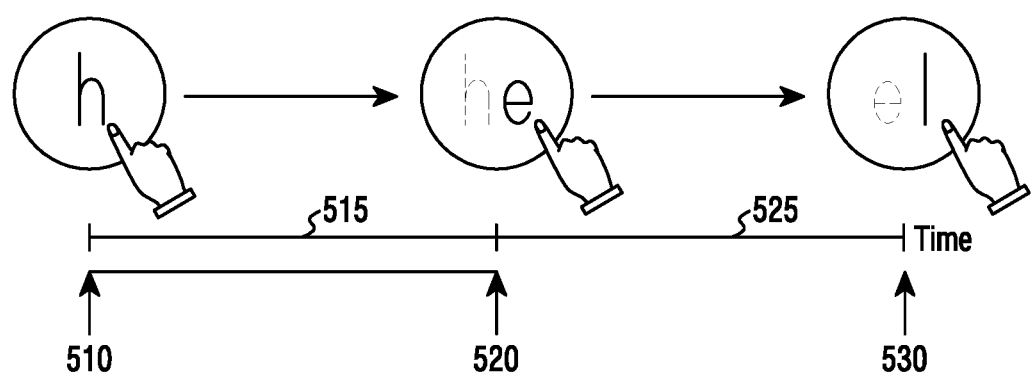
FIG. 5A and FIG. 5B are diagrams of an operation of applying a graphic effect of a stroke, based on a complexity corresponding to a language, in an electronic device, according to an embodiment.
Figure 5B:
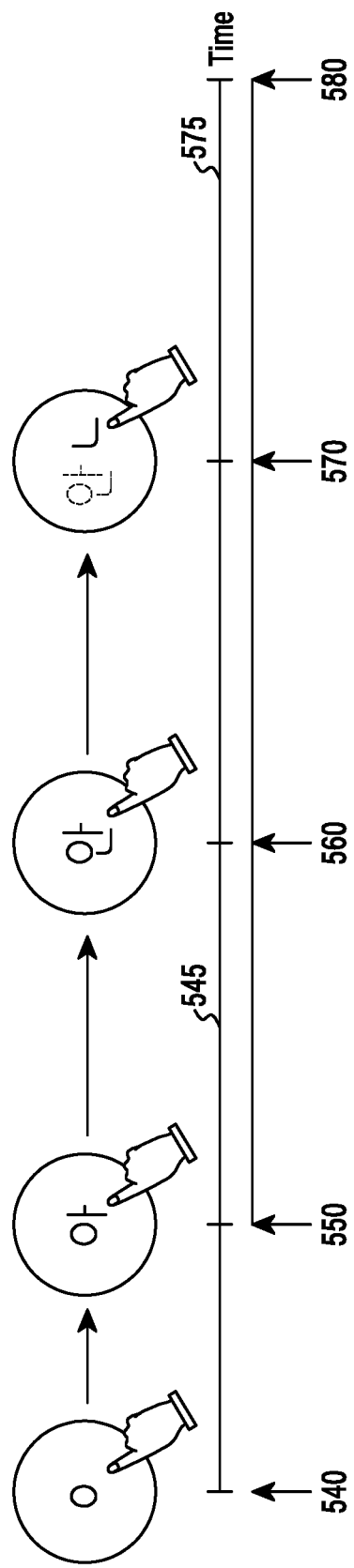

FIG. 4 is a flowchart of a method for applying a graphic effect of a stroke, based on a complexity corresponding to a language, in an electronic device, according to an embodiment. FIG. 5A and FIG. 5B are diagrams of an operation of applying the graphic effect of the stroke, based on the complexity corresponding to the language, in the electronic device, according to an embodiment. Hereinafter, unless otherwise noted, when an electronic device is referenced, it is assumed to be the electronic device 101 or the electronic device 201.

Referring to FIG. 4, in step 410, the processor 120 identifies a stroke constituting a character in accordance with a handwriting input sensed through the display 160. The handwriting input may be a touch, gesture, proximity or hovering input that utilizes a part of a user's body (e.g., finger) or an electronic pen.

In step 420, the processor 120 controls the display 160 to display the identified stroke. For example, referring to FIG. 5A, in response to the processor 120 identifying a stroke indicating 'h' in accordance with a handwriting input sensed through the display 160, the processor 120 may control the display 160 to display the identified stroke at a time point 510. Additionally, referring to FIG. 5B, in response to the processor 120 identifying a stroke indicating 'ㅇ' in accordance with a handwriting input sensed through the display 160, the processor 120 may control the display 160 to display the identified stroke at a time point 540.

In step 430, the processor 120 identifies a language corresponding to the identified stroke based on a reference character stored in the memory 130. For example, referring to FIG. 5A, in response to a stroke indicating 'h' being inputted through the display 160, the processor 120 may identify that a language corresponding to the inputted stroke is English, because the inputted stroke is matched with an alphabet small letter 'h' stored in a database.

The processor 120 may identify the language, based on a plurality of inputted strokes. For example, as illustrated in FIG. 5B, a stroke inputted at a time point 540 indicates 'ㅇ', and the processor 120 recognizes that the inputted stroke is matched with any one of a Hangeul 'ㅇ (Hangeul phonetic symbol: ieung)', a number '0 (Hangeul phonetic symbol: young)', an alphabet small letter 'o' or an alphabet capital letter 'O'. In response to a stroke inputted at a time point 550, e.g., indicates 'ㅏ', the processor 120 may identify that a language corresponding to the strokes inputted at the time point 540 and the time point 550 is Hangeul, because a combination of the stroke inputted at the time point 540 and the stroke inputted at the time point 550 is a Hangeul '아'.

In step 440, the processor 120 applies a graphic effect of the stroke according to a complexity corresponding to the identified language, and the processor 120 may adjust a variation value for the graphic effect of the stroke. The variation value may include a delay or a duration of the stroke. The delay is a value that indicates a time interval ranging from a time point at which a stroke is displayed through the display 160 to a time point at which a graphic effect of the displayed stroke is applied. The duration is a value that indicates a time interval ranging from a time point at which a graphic effect of a stroke is applied to a time point at which the application of the graphic effect of the stroke is completed.

As illustrated in FIG. 5A, the processor 120 may apply an effect in which a displayed stroke disappears. When a language corresponding to the stroke displayed at the time point 510 is the English language, the processor 120 applies a delay and duration of a complexity corresponding to the English language to provide a graphic effect. A time interval 515 (unit: sec (second) or ms (millisecond)) corresponds to a delay for a graphic effect of a stroke. The processor 120 may set a delay (i.e., an interval of the time interval 515), wherein a graphic effect of a displayed stroke is applied at a time point 520. The stroke corresponding to the English language small letter 'h' begins to disappear after the time interval 515 is elapsed. A time interval 525 (unit: sec or ms) corresponds to a duration for a graphic effect of a stroke. The processor 120 may set a duration (i.e., an interval of the time interval 525), wherein the graphic effect applied at the time point 520 is completed at a time point 530. In response to the graphic effect of the stroke including an effect in which the stroke disappears, the stroke corresponding to the English language small letter 'h' gradually disappears during the time interval 525, and completely disappears on the display 160 at a time point 530.

Referring to FIG. 5B, when a language corresponding to a displayed stroke is Hangeul, the processor 120 applies a delay and duration of a complexity corresponding to Hangeul to provide a graphic effect. Since the complexity corresponding to Hangeul is greater than a complexity corresponding to the English language, the processor 160 may apply a delay and duration higher than the delay and duration applied in FIG. 5A. The processor 120 may set a delay (i.e., an interval of a time interval 545), wherein a graphic effect of a displayed stroke is applied at a time point 570. The time interval 545 corresponds to a greater delay than the time interval 515 illustrated in FIG. 5A. A stroke corresponding to a Hangeul 'ㅇ' begins to disappear after the time interval 545 is elapsed. Also, the processor 120 may set a duration (i.e., an interval of a time interval 575), wherein the graphic effect applied at the time point 570 is completed at a time point 580. The time interval 575 corresponds to a greater duration than the time interval 525. The stroke corresponding to the Hangeul 'ㅇ' gradually disappears during the time interval 575, and completely disappears on the display 160 at the time point 580. The processor 160 may also apply an effect of making only the stroke indicating 'ㅇ,' among the strokes indicating 'ㅇ', 'ㅏ' and 'ㄴ' displayed through the display 160, disappear at the time point 570. Also, the processor 120 may also apply an effect in which all the strokes constituting one character "안" disappear simultaneously.

FIG. 4 and FIG. 5 assume that a graphic effect corresponds to an effect in which a stroke disappears, but the processor 120 may apply various graphic effects. For example, the processor 120 may apply any one of an effect in which a color of a displayed stroke is changed, an effect in which the displayed stroke is shifted to the left, an effect in which a displayed handwriting input disappears while being changed into a preset font, or an effect in which the displayed stroke disappears while being shifted to the left, or apply a combination of them. Also, while FIG. 5A and FIG. 5B illustrate that an interval among the time point 510, the time point 520, the time point 530, the time point 540, the time point 550, the time point 560, the time point 570, and the time point 580 can be constant, the interval among the respective time points may be varied according to a handwriting input speed.

Figure 6:
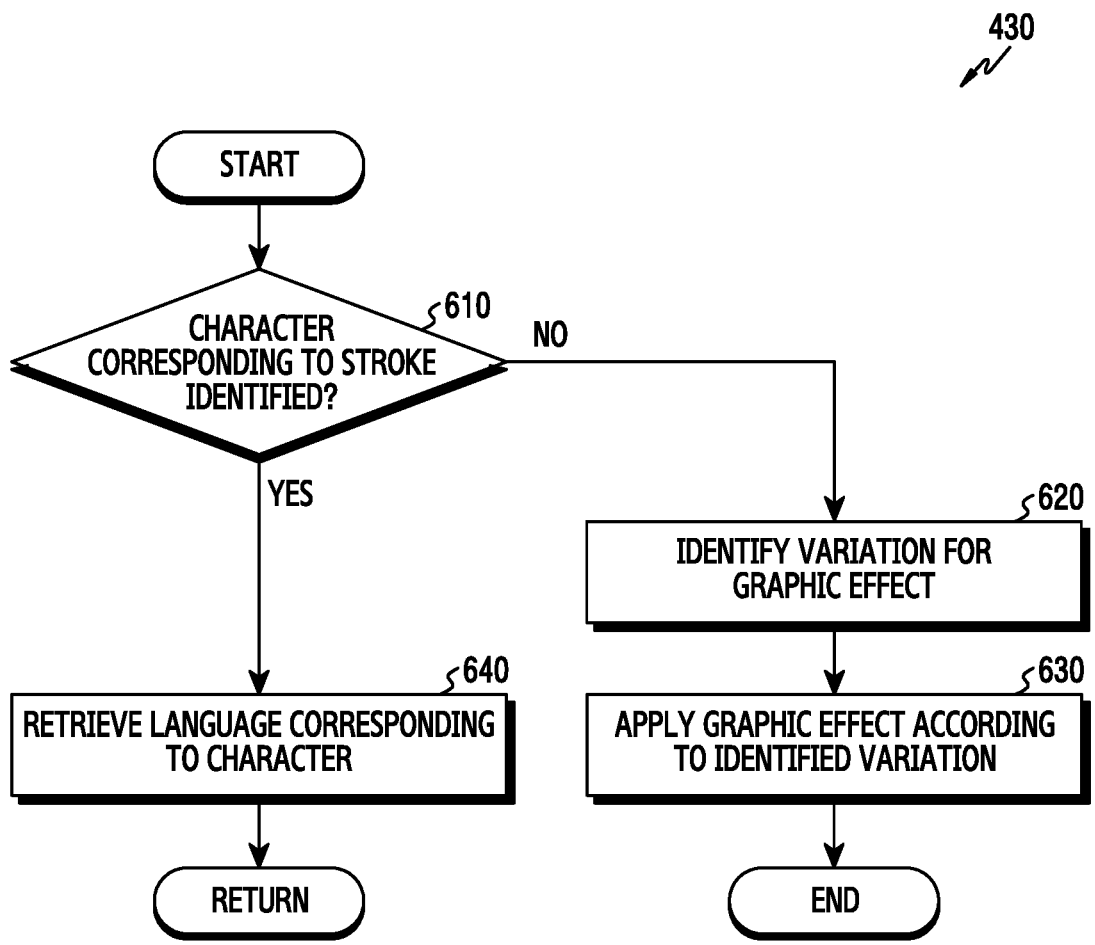
FIG. 6 is a flowchart of a method for identifying a language, based on character identification or non-identification, in an electronic device, according to an embodiment.

FIG. 6 is a flowchart of a method for identifying a language, based on character identification or non-identification, in an electronic device, according to an embodiment. FIG. 6 is a more detailed description of the step 430 of FIG. 4.

Referring to FIG. 6, in step 610, the processor 120 identifies whether a character corresponding to a stroke is identified, i.e., whether the inputted stroke constitutes a character having a specific meaning. In response to the character corresponding to the stroke being identified, the processor 120 proceeds to step 640 and retrieves a language corresponding to the identified character.

In response to the character corresponding to the stroke not being identified, in step 620, the processor 120 identifies a variation value for a graphic effect, without retrieving a language separately. The variation value may include a delay or duration of the graphic effect. The variation value may be a value that is preset according to a complexity of a specific language. Also, the variation value may be a value that is preset by a user input. In step 630, the processor 120 applies the graphic effect according to the identified variation value.

As illustrated in FIG. 5A, the processor 120 identified an alphabet small letter 'h' corresponding to an inputted stroke, so the processor 120 may retrieve a language (i.e., English) corresponding to the identified character. As illustrated in FIG. 5B, in response to a stroke inputted through the display 160 representing 'ㅇ', the processor 120 may identify that an inputted stroke corresponds to any one of a Hangeul 'ㅇ (ieung)', a number '0 (young)', an alphabet small letter 'o' or an alphabet capital letter 'O', according to a preset language priority or randomly. In response to the inputted stroke being the Hangeul 'ㅇ (ieung)', the inputted stroke does not constitute one character, so the processor 120 applies a graphic effect of the inputted stroke according to a preset variation value. In response to the inputted stroke corresponding to any one of the number '0 (young)', the alphabet small letter 'o' or the alphabet capital letter 'O', the inputted stroke constitutes one character, so the processor 120 identifies a language (number or English) corresponding to the character.

Figure 7:
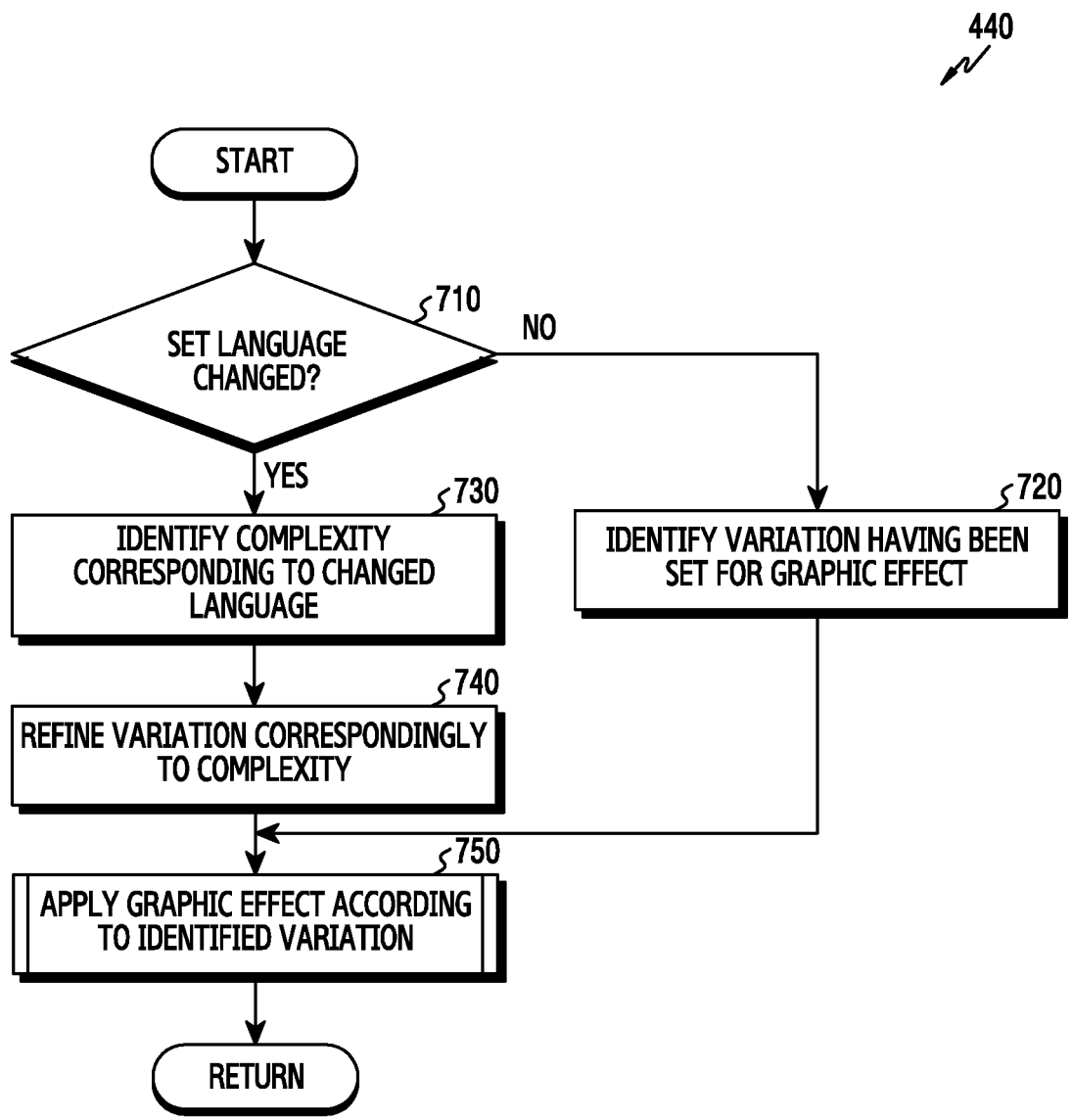
FIG. 7 is a flowchart of a method for applying a graphic effect of a stroke in an electronic device, according to an embodiment.
Figure 8:
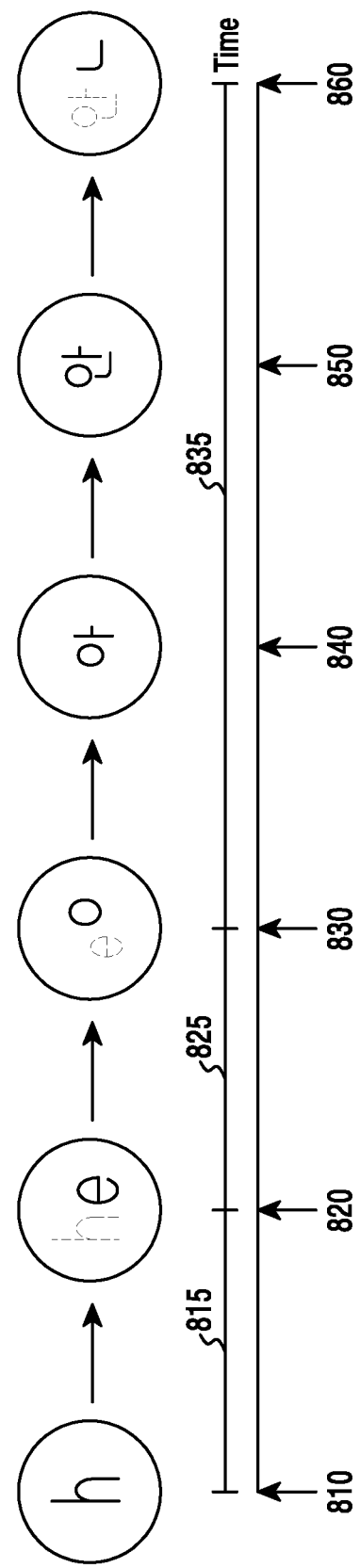
FIG. 8 is a diagram of an operation of applying a graphic effect of a stroke, based on a changed language, in an electronic device, according to an embodiment.

FIG. 7 is a flowchart of a method for applying a graphic effect of a stroke in an electronic device, according to an embodiment. FIG. 8 is a diagram of an operation of applying the graphic effect of the stroke, based on a changed language, in the electronic device, according to an embodiment. FIG. 7 is a more detailed description of step 440 of FIG. 4. FIG. 8 describes an operation in which the processor 120 adjusts a delay for an effect, in which a stroke disappears.

Referring to FIG. 7, in step 710, the processor 120 identifies whether a set language is changed. The processor 120 identifies whether the identified language is the same as a previously identified language. In response to the set language not having been changed, the processor 120 does not identify a separate complexity. In step 720, the processor 120 identifies a preset variation value for a graphic effect and, in step 750, applies the graphic effect according to the identified variation value.

As illustrated in FIG. 8, it is assumed that a language corresponding to a stroke indicating 'h' at a time point 810 is English, and a delay for a graphic effect of the inputted stroke is set as a value corresponding to a time interval 815. In response to a stroke indicating 'e' being inputted at a time point 820, the processor 120 may identify that a language identified correspondingly to the inputted stroke is not changed from a previously identified language, because the language corresponding to the inputted stroke is English. In this case, a delay (i.e., a value corresponding to a time interval 825) for a graphic effect of the stroke indicating 'e' is not changed, and is the same as the delay corresponding to the time interval 815.

In response to the set language having been changed, in step 730, the processor 120 identifies a complexity corresponding to the changed language. A complexity corresponding to a language is an average complexity of each language, and may be a value stored in the memory 130. For example, because the number of strokes required for writing Hangeul is averagely greater than the number of strokes required for writing alphabet letters, a complexity corresponding to Hangeul may be set greater than a complexity corresponding to English.

In step 740, the processor 120 refines a variation value correspondingly to the identified complexity and, in step 750, applies a graphic effect of a displayed stroke according to the variation value. For example, in response to a stroke indicating 'ㅇ' being inputted at a time point 830, and a stroke indicating 'ㅏ' being inputted at a time point 840, the processor 120 may identify that the set language has been changed from English to Hangeul. Since the complexity corresponding to Hangeul is greater than the complexity corresponding to English, the processor 120 may set a delay higher than a previous delay (that is, an interval of a time interval 835 may be set greater than an interval of each of the time interval 815 and the time interval 825). The stroke indicating 'ㅇ' disappears after the lapse of the time interval 835, so a user of the electronic device 101 may identify that strokes constituting a character '안' are all written through the display 160.

FIG. 8 is an example in which all of the strokes constituting the character '안' disappear simultaneously from a time point 860, but the strokes may disappear sequentially after being inputted to the display 160. For example, the stroke displayed at the time point 840 (i.e., the stroke indicating 'ㅏ') may begin to disappear after the stroke indicating 'ㅇ' disappears, and a stroke displayed at a time point 850 (i.e., a stroke indicating 'ㄴ') may begin to disappear after the stroke indicating 'ㅏ' disappears.

FIG. 8 is also an example in which the processor 120 adjusts a delay for an effect in which a stroke disappears; various graphic effects and various variation values may be adjusted. For example, the processor 120 may control a duration for which the effect in which the stroke disappears is applied. While FIG. 8 illustrates an interval among the time point 810, the time point 820, the time point 830, the time point 840, the time point 850 and the time point 860 that is constant, the interval among the respective time points may be varied according to a handwriting input speed.

Figure 9:
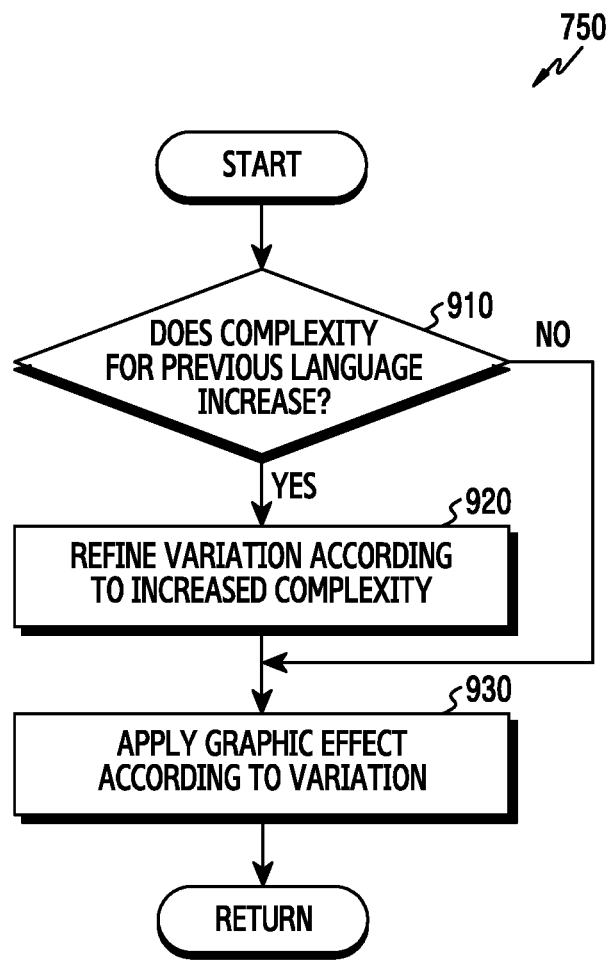
FIG. 9 is a flowchart of a method for applying a graphic effect of a stroke, based on an increased complexity, in an electronic device, according to an embodiment.
Figure 10:
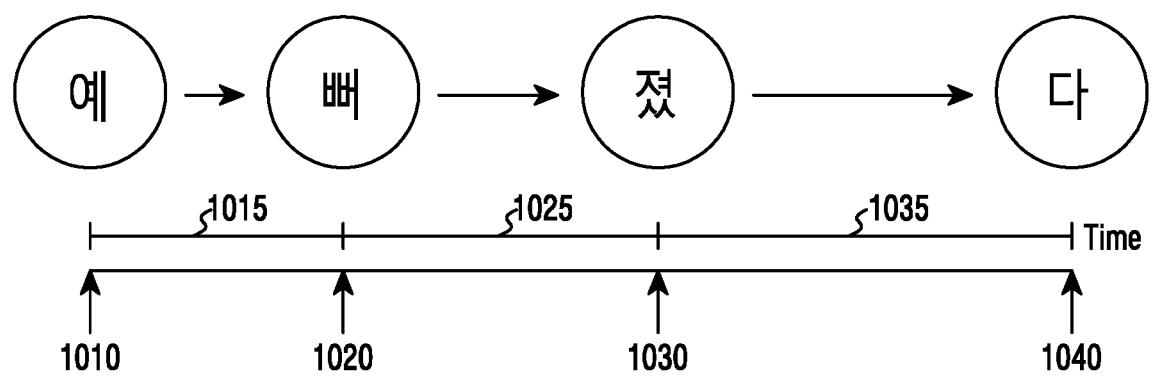
FIG. 10 is a diagram of an operation of applying a graphic effect of a stroke, based on an increased complexity, in an electronic device, according to an embodiment.

FIG. 9 is a flowchart for applying a graphic effect of a stroke, based on an increased complexity, in an electronic device, according to an embodiment. FIG. 10 is a diagram of an operation of applying the graphic effect of the stroke, based on the increased complexity, in the electronic device, according to an embodiment. FIG. 9 is a more detailed description of step 750 of FIG. 7. FIG. 10 is an example in which the processor 120 adjusts a delay for an effect in which a stroke disappears.

Referring to FIG. 9, in step 910, the processor 120 identifies whether a complexity for a previous language has been increased. In response to the complexity not having been increased, in step 930, the processor 120 applies a graphic effect according to a set variation value.

In response to the complexity having been increased, in step 920, the processor 120 refines a variation value according to the increased complexity. The variation value is increased in proportion to the increased complexity, but is not necessarily in direct proportion to the increased complexity. For example, in response to the complexity increasing from 1 by 1, the delay or duration may increase by 100 ms. Conversely, in response to the complexity increasing from 5 by 1, the delay or duration may increase by 80 ms. In step 930, the processor 120 applies a graphic effect according to the refined variation value.

Referring to FIG. 10, strokes are inputted in sequence of '예', '뻐', '졌', and '다' through the display 160. Assuming that the number of strokes constituting a character '예' is 5, the number of strokes constituting a character '뻐' is 8, the number of strokes constituting a character '졌' is 10, and the number of strokes constituting a character '다' is 4, then the number of strokes constituting the character '뻐' is greater than the number of strokes constituting the character '예', so the processor 120 may identify that a complexity for a previous language has been increased. The processor 120 sets a delay (corresponding to a time interval 1025), wherein the delay has a greater value than a previously set delay (corresponding to a time interval 1015). The number of strokes constituting the character '졌' is greater than the number of strokes constituting the character '뻐', so the processor 120 may identify that a complexity for a previous language has been increased. The processor 120 sets a delay (corresponding to a time interval 1035), wherein the delay has a higher value than the previously set delay (corresponding to the time interval 1025). Conversely, the number of strokes constituting the character '다' is less than the number of strokes constituting the character '졌', so the processor 120 may identify that a complexity for a previous language has not been increased.

FIG. 10 is an example in which a delay for an effect, e.g., a stroke disappears, is adjusted, but various graphic effects and various variation values may be adjusted. For example, the processor 120 may control a duration for which the effect in which the stroke disappears is applied.

Figure 11:
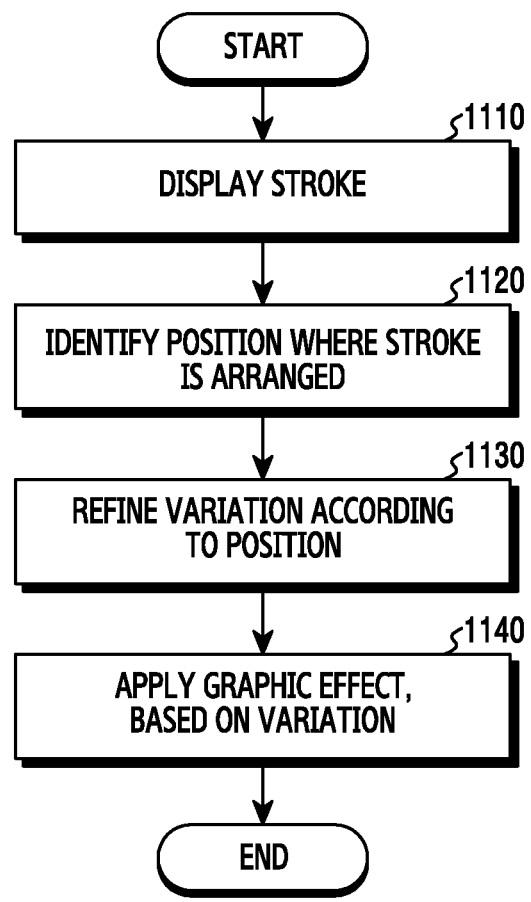
FIG. 11 is a flowchart of a method for applying a graphic effect of a stroke, based on a position where the stroke is arranged or an area rate in which the stroke occupies, in an electronic device, according to an embodiment.
Figure 12A:
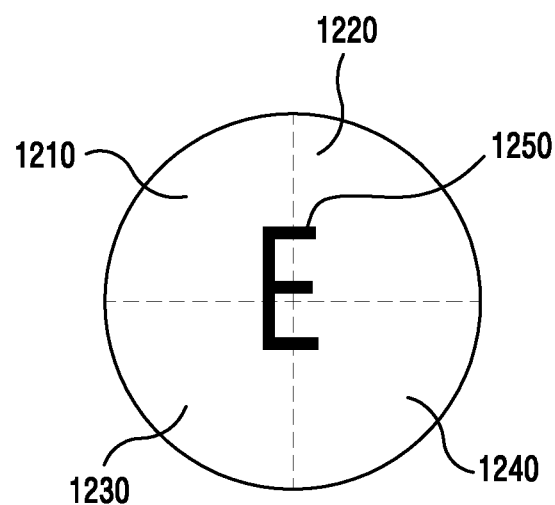
FIG. 12A and FIG. 12B are diagrams of an operation of adjusting a variation value, based on an area rate in which a stroke occupies, in an electronic device, according to an embodiment.
Figure 12B:
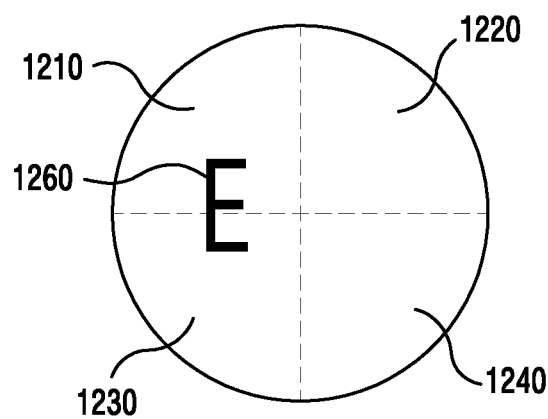
Figure 13A:
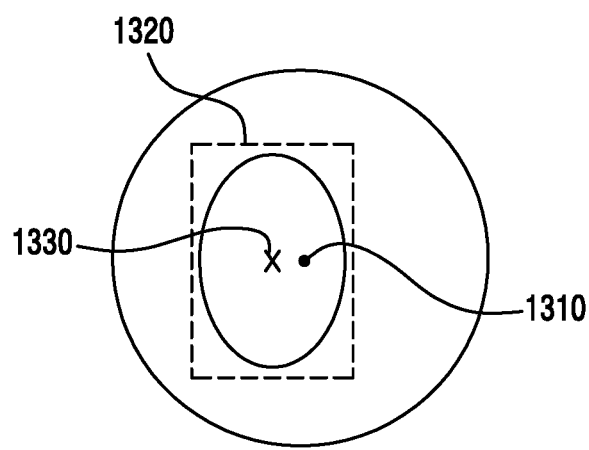
FIG. 13A and FIG. 13B are diagrams of an operation of adjusting a variation value, based on a position where a stroke is arranged, in an electronic device, according to an embodiment.
Figure 13B:
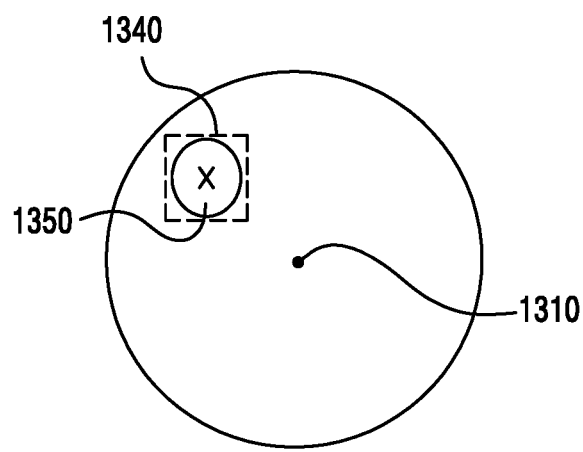

FIG. 11 is a flowchart of a method for applying a graphic effect of a stroke, based on a position where the stroke is arranged or an area rate in which the stroke occupies, in an electronic device, according to an embodiment. FIGS. 12A and 12B are diagrams of an operation of adjusting a variation value, based on the area rate in which the stroke occupies, in the electronic device, according to an embodiment. FIGS. 13A and 13B diagrams of an operation of adjusting the variation value, based on the position where the stroke is arranged, in the electronic device, according to an embodiment.

Referring to FIG. 11, in step 1110, the processor 120 controls the display 160 to display a stroke constituting a character according to a sensed handwriting input. The handwriting input may be a touch, gesture, proximity or hovering input that utilizes a part of a user's body (e.g., finger) or an electronic pen.

In step 1120, the processor 120 identifies a position where the displayed stroke is arranged on the display 160 or an area rate in which the stroke occupies on the display 160.

The processor 120 may identify the position where the stroke is arranged or the area rate in which the stroke occupies according to various schemes. As illustrated in FIG. 12A and FIG. 12B, the processor 120 may identify an area rate in which a displayed stroke occupies on the display 160, based on whether the number of regions where the displayed stroke is located among a plurality of regions included in the display 160 is greater than or equal to a given region threshold value. It is assumed that a region 1210, a region 1220, a region 1230 and a region 1240 are included in the display 160, and the given region threshold value is 3, and a stroke 1250 is located in all of the region 1210, the region 1220, the region 1230 and the region 1240 included in the display 160. In other words, the number of regions where the stroke 1250 is located is 4. The number of regions where the stroke 1250 is located is greater than or equal to the given region threshold value, so the processor 120 may identify that an area rate in which the stroke 1250 occupies through the display 160 is relatively high.

Referring to FIG. 12B, a stroke 1260 is located only in the region 1210 and the region 1230. In other words, the number of regions where the stroke 1260 is located is 2. The number of regions where the stroke 1260 is located is less than the given region threshold value, so the processor 120 may identify that an area rate in which the stroke 1260 occupies through the display 160 is relatively low.

As illustrated in FIG. 13A and FIG. 13B, the processor 120 may identify a position where a stroke is arranged based on whether a distance between the displayed stroke and a center point given on the display 160 is greater than or equal to a given distance threshold value. It is assumed that a center point 1310 is set on the display 160. In response to a stroke indicating '○' being inputted, the processor 120 sets an edge region 1320 surrounding the inputted stroke. The processor 120 identifies a center point 1330 of the set edge region, and also identifies whether a distance between the center point 1330 of the edge region 1320 and the center point 1310 of the display 160 is less than the given distance threshold value. As illustrated in FIG. 13A, in response to the distance between the center point 1330 of the edge region 1320 and the center point 1310 of the display 160 being less than the given distance threshold value, the processor 120 may identify that the inputted stroke is located at the center of the display 160. As illustrated in FIG. 13B, in response to the distance between a center point 1350 of an edge region 1340 and the center point 1310 being greater than or equal to the given distance threshold value, the processor 120 may identify that the inputted stroke is not located at the center of the display 160.

In step 1130, the processor 120 refines a variation value for a graphic effect according to the identified position or area rate. In response to the area rate in which the inputted stroke occupies on the display 160 is greater than or equal to the given region threshold value or the inputted stroke being located at the center of the display 160 as illustrated in FIG. 12A and FIG. 13A, a space for additionally inputting another stroke is insufficient, so the processor 120 may set a delay or duration relatively low for an effect in which the inputted stroke disappears. Also, in response to the area rate in which the inputted stroke occupies on the display 160 is less than the given region threshold value or the inputted stroke not being located at the center of the display 160 as illustrated in FIG. 12B and FIG. 13B, another stroke may be additionally inputted, so the processor 120 may set the delay relatively high or duration for the effect in which the inputted stroke disappears.

In step 1140, the processor 120 applies the graphic effect according to the refined variation value. The graphic effect may be varied according to an implementation method. The processor 120 may apply any one of an effect in which a displayed stroke disappears, an effect in which a color of the displayed stroke is changed, an effect in which the displayed stroke is shifted to the left, an effect in which a displayed handwriting input disappears while being changed into a preset font, or an effect in which the displayed stroke disappears while being shifted to the left, or apply a combination of them.

As described above, one stroke may include a time point at which a touch input is sensed in the electronic device 101 to a time point at which the corresponding touch input is released. For example, a Hangeul '길' may be written by six strokes. Conversely, in response to the Hangeul '길' being written in cursive script, the electronic device 101 may recognize that the corresponding character has been inputted by one stroke. The electronic device may recognize that a complexity of the cursive script '길' is the same as a complexity of an alphabet 'a'. The electronic device 101 may identify a variation value for a graphic effect based on a time for which a handwriting input is inputted, in addition to complexity of a language.

Figure 14:
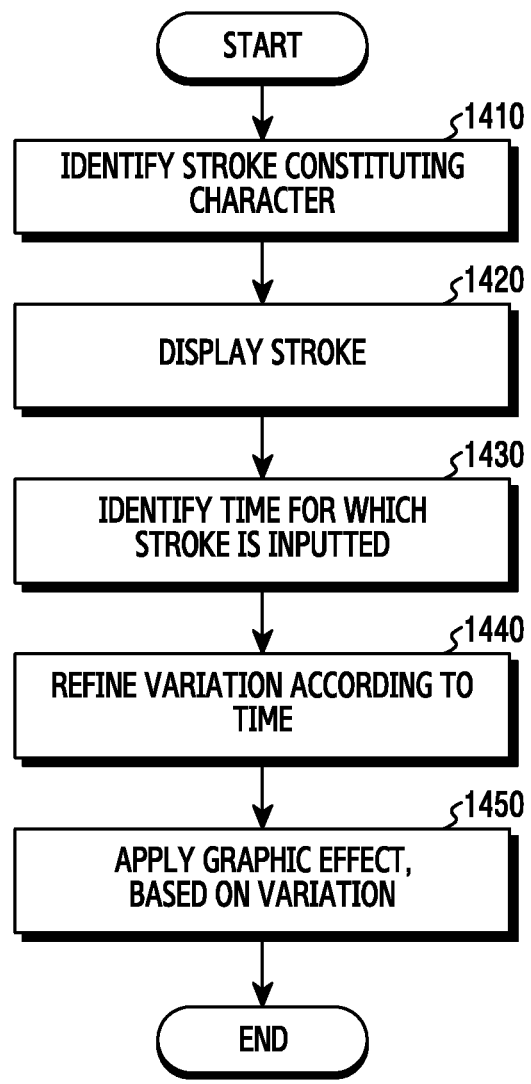
FIG. 14 is a flowchart of a method for applying a graphic effect of a stroke, based on a time for which the stroke is inputted, in an electronic device, according to an embodiment.
Figure 15A:
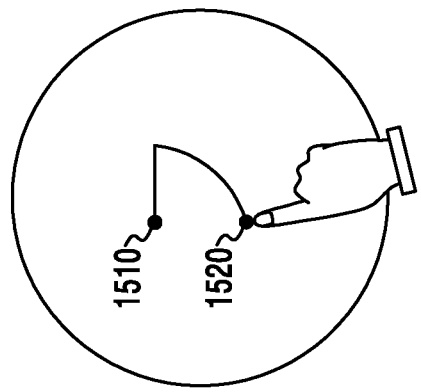
FIGS. 15A, 15B and 15C are diagrams of an operation of adjusting a variation value, based on a time for which a stroke is inputted, in an electronic device, according to an embodiment.
Figure 15B:
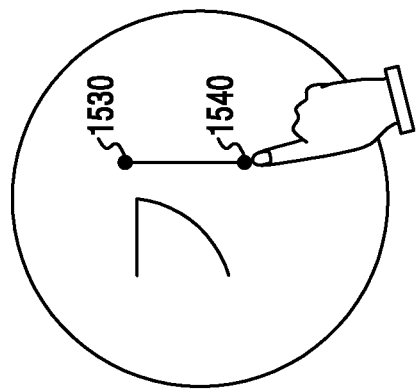
Figure 15C:
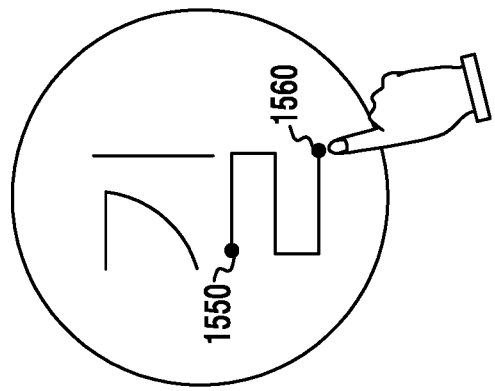
Figure 16:
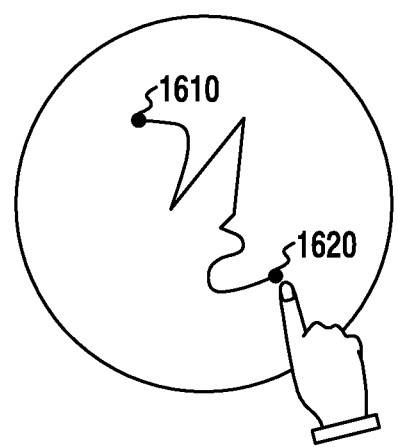
FIG. 16 is a diagram of an operation of adjusting a variation value, based on a time for which a stroke is inputted, in an electronic device, according to an embodiment.

FIG. 14 is a flowchart of a method for applying a graphic effect of a stroke, based on a time for which the stroke is inputted, in an electronic device, according to an embodiment. FIGS. 15A, 15B and 15C are diagrams of an operation of adjusting a variation value, based on the time for which the stroke is inputted, in the electronic device, according to an embodiment. FIG. 16 is a diagram of operation of adjusting the variation value, based on the time for which the stroke is inputted, in the electronic device, according to an embodiment.

Referring to FIG. 14, in step 1410, the processor 120 identifies a stroke constituting a character in accordance with a handwriting input sensed through the display 160. The processor 120 may recognize, as one stroke, a time point at which a handwriting input begins to be sensed through a display to a time point at which the corresponding handwriting input comes unstuck (or is no longer sensed through the display). In step 1420, the processor 120 controls the display 160 to display the identified stroke.

In step 1430, the processor 120 identifies a time for which the stroke is inputted. As illustrated in FIG. 15A-FIG. 16, the processor 120 may identify a time interval that ranges from a time point (i.e., a time point 1510, a time point 1530, a time point 1550 or a time point 1610) at which a handwriting input begins to be sensed through a display to a time point (i.e., a time point 1520, a time point 1540, a time point 1560 or a time point 1620) at which the corresponding handwriting input comes unstuck (or is no longer sensed through the display).

In step 1440, the processor 120 refines a variation value for a graphic effect according to the identified time. When the time for which the stroke is inputted is relatively long or a speed at which the stroke is inputted is slow, the processor 120 may set high a delay or a duration for the graphic effect. When the time for which the stroke is inputted is relatively short or the speed at which the stroke is inputted is fast, the processor 120 may set low the delay or a duration for the graphic effect. For example, because a length of a stroke indicating '|' as illustrated in FIG. 15B is shorter than a length of a stroke indicating 'ㄱ' as illustrated in FIG. 15A, a time for which the stroke indicating '|' is inputted may be short. The processor 120 may set a delay or duration for the stroke indicating '|' to be short. Because a length of a stroke indicating 'ㄹ' as illustrated in FIG. 15C is longer than the length of the stroke indicating '|', a time for which the stroke indicating 'ㄹ' is inputted may be long. The processor 120 may set a delay or duration for the stroke indicating 'ㄹ' to be high. In response to an input for indicating '길' being inputted in cursive script as illustrated in FIG. 16, a length of the inputted stroke is relatively long than a generally inputted stroke, so the processor 120 may set high a delay or duration corresponding to the inputted stroke.

In step 1450, the processor 120 applies the graphic effect based on the variation value. In response to an effect in which a stroke disappears being set in FIGS. 15A, 15B and 15C, the processor 120 may control the display 160 to apply the effect in which the displayed stroke disappears based on the identified delay or duration.

A method of the electronic device 101 for applying a graphic effect includes identifying a stroke constituting a character, based on a sensed input, displaying the identified stroke through the display 160 of the electronic device 101, identifying a language corresponding to the identified stroke, and applying a variation value for a graphic effect of the displayed stroke, based on a complexity of the identified language.

Applying the graphic effect of the displayed stroke includes any one of applying an effect in which the displayed stroke and a previously displayed stroke disappear in order, or applying an effect in which the displayed stroke and the previously displayed stroke disappear simultaneously. Applying the effect in which the displayed stroke disappears includes at least one of applying an effect in which the displayed stroke disappears while a color of the displayed stroke is changed, and applying an effect in which the displayed stroke disappears while the displayed stroke is shifted to the left.

Identifying the language corresponding to the identified stroke includes, in response to a character corresponding to the identified stroke being identified, retrieving a language corresponding to the identified character, based on a reference character stored in the memory 130 of the electronic device 101.

Applying the graphic effect of the displayed stroke includes, in response to the identified language having been changed, retrieving a complexity corresponding to the changed language, refining the variation value, based on the retrieved complexity, and applying the graphic effect of the displayed stroke according to the refined variation value. The variation value for the graphic effect includes a delay or duration.

The delay represents a time interval ranging from a time point at which the stroke is displayed to a time point at which the graphic effect is applied, and the duration represents a time interval ranging from a time point at which the graphic effect is applied to a time point at which the graphic effect is completely applied.

A method of the electronic device 101 further includes, in response to the complexity of the identified language having been increased, refining the variation value, based on the increased complexity, and applying the graphic effect of the displayed stroke according to the refined variation value.

An electronic device of the disclosure and an operation method thereof may provide a convenience to a user who inputs a plurality of strokes, by controlling a variation value for a graphic effect of a stroke in accordance with a complexity corresponding to a language.

An electronic device of the disclosure and an operation method thereof may provide a convenience to a user who inputs a plurality of strokes, by controlling a variation value for a graphic effect of a stroke based on a position where a displayed stroke is arranged.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for applying a graphic effect in an electronic device, the method comprising:
   identifying a stroke constituting a character based on an input sensed through a display of the electronic device;
   displaying the identified stroke through the display;
   identifying a language corresponding to the identified stroke;
   identifying a variation value for a graphic effect of the displayed stroke based on a complexity of the identified language; and
   wherein the variation value represents one of a time interval ranging from a time point at which the stroke is displayed to a time point at which the graphic effect is applied and a time interval ranging from a time point at which the graphic effect is applied to a time point at which the graphic effect is completely applied.

2. The method of claim 1, wherein identifying the language corresponding to the identified stroke comprises:
   in response to a character corresponding to the identified stroke being identified, retrieving the language corresponding to the identified character based on a reference character stored in a memory of the electronic device.

3. The method of claim 1, further comprising:
   applying the graphic effect of the displayed stroke;
   in response to the identified language having been changed, retrieving a complexity corresponding to the changed language;
   refining the variation value based on the retrieved complexity; and
   applying the graphic effect of the displayed stroke according to the refined variation value.

4. The method of claim 3, further comprising:
   in response to the complexity of the identified language having been increased, refining the variation value based on the increased complexity; and
   applying the graphic effect of the displayed stroke according to the refined variation value.

5. The method of claim 1, further comprising one of:
   applying the graphic effect of the displayed stroke;
   applying an effect in which the displayed stroke and a previously displayed stroke disappear sequentially; and
   applying an effect in which the displayed stroke and the previously displayed stroke disappear simultaneously.

6. The method of claim 5, wherein applying the effect in which the displayed stroke and a previously displayed stroke disappears comprises at least one of:

applying an effect in which the displayed stroke disappears while a color of the displayed stroke is changed; and applying an effect in which the displayed stroke disappears while the displayed stroke is shifted to the left.

7. An electronic device for applying a graphic effect comprising:
   a display;
   a memory; and
   a processor operatively coupled with the display and the memory and configured to:
      identify a stroke constituting a character, based on an input sensed through the display;
      display the identified stroke;
      identify a language corresponding to the identified stroke;
      identify a variation value for a graphic effect of the displayed stroke based on a complexity of the identified language, and
      wherein the variation value represents one of a time interval ranging from one of a time point at which the stroke is displayed to a time point at which the graphic effect is applied and a time interval ranging from a time point at which the graphic effect is applied to a time point at which the graphic effect is completely applied.

8. The electronic device of claim 7, wherein the processor is further configured to, in response to a character corresponding to the identified stroke being identified, retrieve a language corresponding to the identified character based on a reference character stored in the memory.

9. The electronic device of claim 7, wherein the processor is further configured to:
   in response to the identified language having been changed, retrieve a complexity corresponding to the changed language;
   refine the variation value based on the identified complexity; and
   apply a graphic effect of the displayed stroke based on the refined variation value.

10. The electronic device of claim 9, wherein the processor is further configured to:
   in response to the complexity of the identified language having been increased, refine the variation value based on the increased complexity; and
   apply the graphic effect of the displayed stroke according to the refined variation value.

11. The electronic device of claim 7, wherein the processor is configured to:
   apply an effect in which the displayed stroke and a previously displayed stroke disappear sequentially; or
   apply an effect in which the displayed stroke and the previously displayed stroke disappear simultaneously.

12. The electronic device of claim 11, wherein the processor is configured to:
   apply an effect in which the displayed stroke disappears while a color of the displayed stroke is changed; or
   apply an effect in which the displayed stroke disappears while the displayed stroke is shifted to the left.

13. An electronic device for applying a graphic effect comprising:
   a display;
   a memory; and
   a processor operatively coupled with the display and the memory and configured to:
      identify a stroke constituting a character based on an input sensed through the display;
      display the identified stroke;
      identify a position where the displayed stroke is arranged on the display;
      identify a variation value for a graphic effect of the displayed stroke based on the arranged position; and
      wherein the variation value represents one of a time interval ranging from a time point at which the stroke is displayed to a time point at which the graphic effect is applied and a time interval ranging from a time point at which the graphic effect is applied to a time point at which the graphic effect is completely applied.

14. The electronic device of claim 13, wherein the processor is further configured to:
   apply an effect in which the displayed stroke and a previously displayed stroke disappear sequentially; or
   apply an effect in which the displayed stroke and the previously displayed stroke disappear simultaneously.

15. The electronic device of claim 13, wherein the processor is further configured to:
   apply an effect in which the displayed stroke disappears while a color of the displayed stroke is changed; or
   apply an effect in which the displayed stroke disappears while the displayed stroke is shifted to the left.

16. The electronic device of claim 13, wherein the processor is further configured to:
   identify a time for which the identified stroke is inputted; and
   refine the variation value based on the identified time.

17. The electronic device of claim 16, wherein the processor is further configured to:
   in response to the identified time being greater than or equal to an input time of a previously identified stroke, set the variation value to be higher; and
   in response to the identified time being shorter than the input time of the previously identified stroke set the variation value to be lower.

* * * * *